(12) United States Patent
Kedem et al.

(10) Patent No.: US 7,020,745 B1
(45) Date of Patent: Mar. 28, 2006

(54) AMBA-BASED SECONDARY CACHE CONTROLLER AND METHOD OF OPERATING THE SAME

(75) Inventors: Rafael Kedem, Sunnyvale, CA (US); Balraj Singh, Morgan Hill, CA (US)

(73) Assignee: LSI Logic Corporation, Milpitas, CA (US)

( * ) Notice: Subject to any disclaimer, the term of this patent is extended or adjusted under 35 U.S.C. 154(b) by 496 days.

(21) Appl. No.: 10/326,173

(22) Filed: Dec. 20, 2002

(51) Int. Cl.
*G06F 12/00* (2006.01)

(52) U.S. Cl. .................. 711/118; 711/100; 711/122; 711/125

(58) Field of Classification Search ............ 711/118, 711/100, 122, 125
See application file for complete search history.

(56) References Cited

U.S. PATENT DOCUMENTS 6,829,692 B1 * 12/2004 Schmisseur et al. ........ 711/173

* cited by examiner

*Primary Examiner*—Mano Padmanabhan
*Assistant Examiner*—Mehdi Namazi
(74) *Attorney, Agent, or Firm*—Hitt Gaines, P.C.

(57) ABSTRACT

A secondary cache controller, a method of operating a secondary cache and a secondary cache incorporating the controller or the method. In one embodiment, the controller includes: (1) configuration registers that allow at least one cacheable memory range to be defined and (2) a standard bus interface that cooperates with the configuration registers to allow the secondary cache controller to operate in: (2a) a configuration mode in which values are written to the configuration registers via only the standard bus interface to define the at least one cacheable memory range and (2b) an operating mode in which the values govern operation of the secondary cache controller absent external cache control instructions.

20 Claims, 3 Drawing Sheets

AMBA-BASED SECONDARY CACHE CONTROLLER AND METHOD OF OPERATING THE SAME

TECHNICAL FIELD OF THE INVENTION

The present invention is directed, in general, to cache memory and, more specifically, to secondary cache controllers that operate in the absence of external control instructions.

BACKGROUND OF THE INVENTION

A cache has proven to be an effective way to combine the advantages of fast, but expensive, memory with the affordability of slower memory to achieve the most effective memory system. A cache is architecturally located between the CPU and main memory and consists of a cache memory and an associated cache controller. As requests for memory access most often affect only a relatively small portion of the main memory, the most frequently addressed data can also be held in the cache. The advantage of this is a much reduced access time, which produces a considerable increase in overall system speed. The data and code that are not required as frequently can be stored in the slower main memory without appreciably affecting program execution time.

When the CPU requires data, it sends out a read request. However, the cache controller intercepts the request from the CPU before the request reaches the main memory and determines whether the requested data is available instead in the cache memory. If so, a "cache hit" is said to have occurred, and the data is read from the cache memory into the CPU. If not, a "cache miss" is said to have occurred, and the data request is forwarded to the main memory for fulfillment. (The requested data and associated address are often updated in the cache.) The instructions directing such cache operations are provided by the CPU via a bus connecting the cache between the CPU and the main memory.

Many currently available computer systems come with two levels of cache. A first level cache ("L1 cache") is architecturally nearer the CPU, and is faster than a second level cache ("L2 cache"). The L2 cache is usually somewhat larger and slower than the L1 cache, although to a diminishing degree with recent technology.

When the CPU-needs to execute an instruction, it looks first in its own data registers. If the needed data isn't there, the CPU looks to the L1 cache and then to the L2 cache. If the data isn't in any cache, the CPU accesses the main memory. When the CPU finds data in one of its cache locations, it's called a "hit," whereas a failure to find the data is a "miss." Every miss introduces a delay, or latency, as the CPU tries a slower level. For high-end processors, it can take from one to three clock cycles to fetch information from the L1 cache, while the CPU waits. It can take 6–12 cycles to get data from an L2 cache on the CPU chip, and dozens or even hundreds of cycles for off-CPU L2 caches.

As mentioned above, the controller for a conventional external cache communicates with the CPU via a processor bus. In this manner, instructions and data are sent by the CPU, interpreted by the cache controller and appropriately executed by the cache controller. However, the cache and cache controller are designed for a specific CPU and a specific processor bus, such that only a specific CPU may instruct the cache controller via only a specific bus and bus interfaces. Those skilled in the art recognize the disadvantages and inefficiencies of such application- and device-specific caches. For example, because prior art secondary caches are tailored to specific processors, a control bus separate from a standard bus is required to route external cache control instructions from the processor to the cache to control its operation. Moreover, in order for the CPU to read and write data to memory, and for the cache to cache data and fulfill the read and write requests in accordance, the CPU must generate external cache control instructions.

Accordingly, what is needed in the art is an external cache that overcomes the disadvantages of the prior art discussed above.

SUMMARY OF THE INVENTION

To address the above-discussed deficiencies of the prior art, the present invention provides a secondary cache controller, a method of operating a secondary cache and a secondary cache incorporating the controller or the method. In one embodiment, the controller includes: (1) configuration registers that allow at least one cacheable memory range to be defined and (2) a standard bus interface that cooperates with the configuration registers to allow the secondary cache controller to operate in: (2a) a configuration mode in which values are written to the configuration registers via only the standard bus interface to define the at least one cacheable memory range and (2b) an operating mode in which the values govern operation of the secondary cache controller absent external cache control instructions.

As described above, prior art secondary caches were tailored to specific processors and required a control bus separate from a standard bus to route external cache control instructions from the processor to the cache to control its operation. In stark contrast, the present invention introduces a novel secondary cache architecture in which configuration registers are initially loaded with values that govern the operation of the secondary cache. Thereafter, the secondary cache is "transparent" to the processor. The processor simply reads and writes data to memory, and the cache caches data and fulfills the read and write requests in accordance with the values without requiring the processor to generate any external cache control instructions. For this reason, the secondary cache of the present invention requires nothing more than a standard bus connection to the processor.

In one embodiment of the present invention, the configuration registers further allow at least one attribute to be associated with the at least one cacheable memory range. The attribute may call for the at least one memory range to be writeback, writethrough or scratchpad, direct mapped or set-associative. Those skilled in the pertinent art understand the various attributes that can be given a range of cache memory.

In one embodiment of the present invention, the cacheable memory range lies within a main memory range. The memory range is therefore backed up by main memory. Writes within the memory range may be written back or written through to the main memory. In an alternative embodiment, the cacheable memory range lies outside of a main memory range. The memory range is therefore not backed up by main memory and should be considered to be only a scratchpad for temporary data storage.

In one embodiment of the present invention, the configuration registers are memory-mapped. To the processor, the configuration registers therefore appear to be specific locations in main memory, making the loading of values into the registers more straightforward. Of course, the registers could alternatively be accessible via a port.

In one embodiment of the present invention, the standard bus interface is adapted for a specific bus (but not a specific processor). The secondary cache of the present invention can be adapted to operate with any standard or proprietary bus.

In an embodiment to be illustrated and described, the standard bus interface is an Advanced Microcontroller Bus Architecture bus interface. However, the secondary cache of the present invention has far broader applicability. Those skilled in the pertinent art are familiar with the many standards for buses in existence today. These and future buses are within the broad scope of the present invention.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
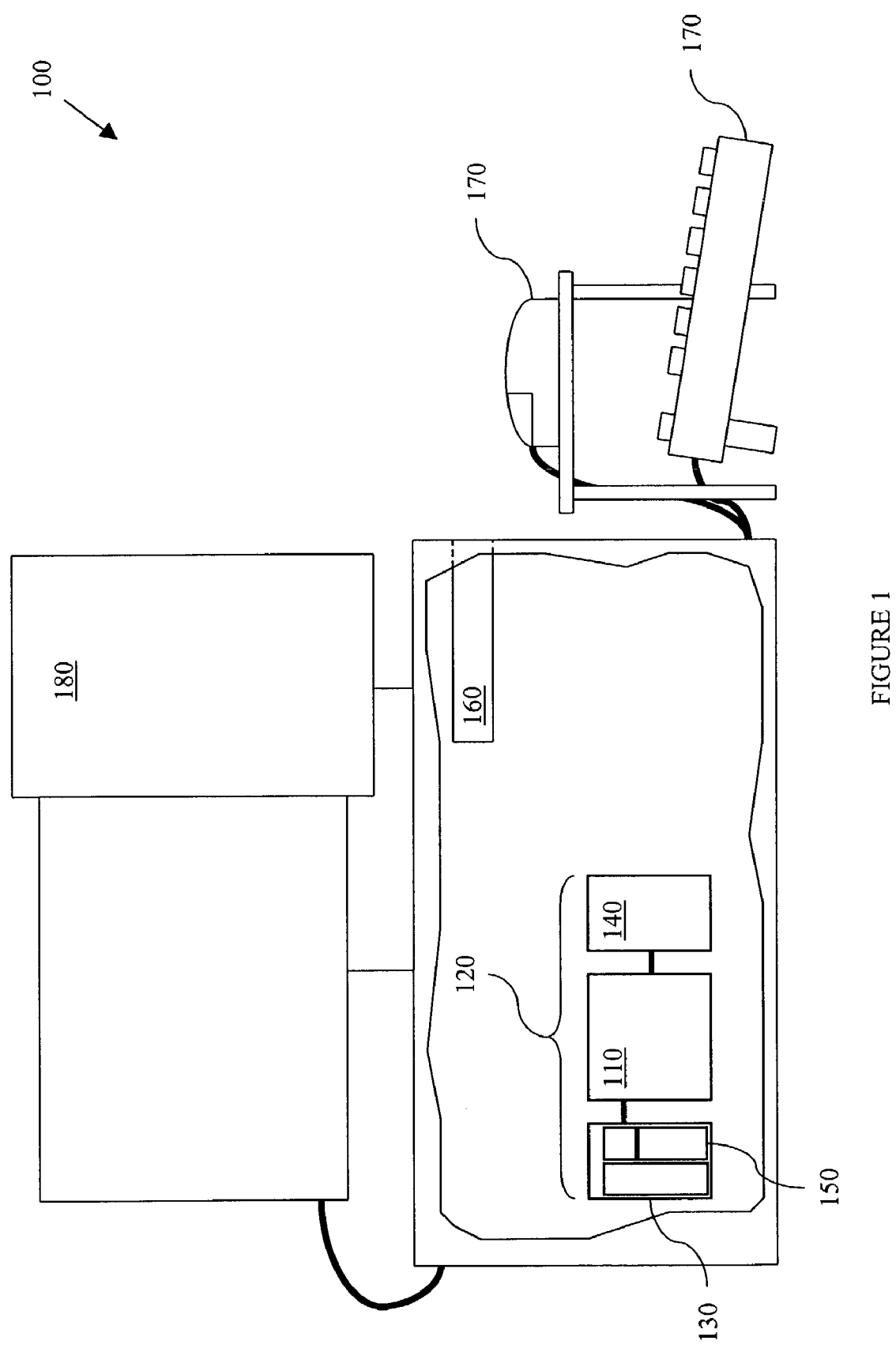
FIG. 1 illustrates a block diagram of one embodiment of a computer that forms an environment within which an L2 cache may be incorporated, or a method of operating an L2 cache may be carried out, according to the principles of the present invention.

Referring initially to FIG. 1, illustrated is a block diagram of one embodiment of a computer 100 that forms an environment within which a secondary cache ("L2 cache") 110 may be incorporated, or a method of operating an L2 cache 110 may be carried out, according to the principles of the present invention. The L2 cache 110 may be part of a memory network 120 that also includes a central processing unit ("CPU") 130, a main memory 140 and a primary cache ("L1 cache") 150. Of course, those skilled in the art will understand that the computer 100 may include additional elements or lack the L1 cache without departing from the broad scope of the present invention. For example, as in the embodiment shown in FIG. 1, the computer 100 may also include one or more conventional mass storage devices 160 (e.g., disk drive), input devices 170 (e.g., a mouse or keyboard) and output devices 180 (e.g., a monitor). Those skilled in the art are familiar with the operation and interaction of such components of conventional computers and computer systems.

Figure 2:
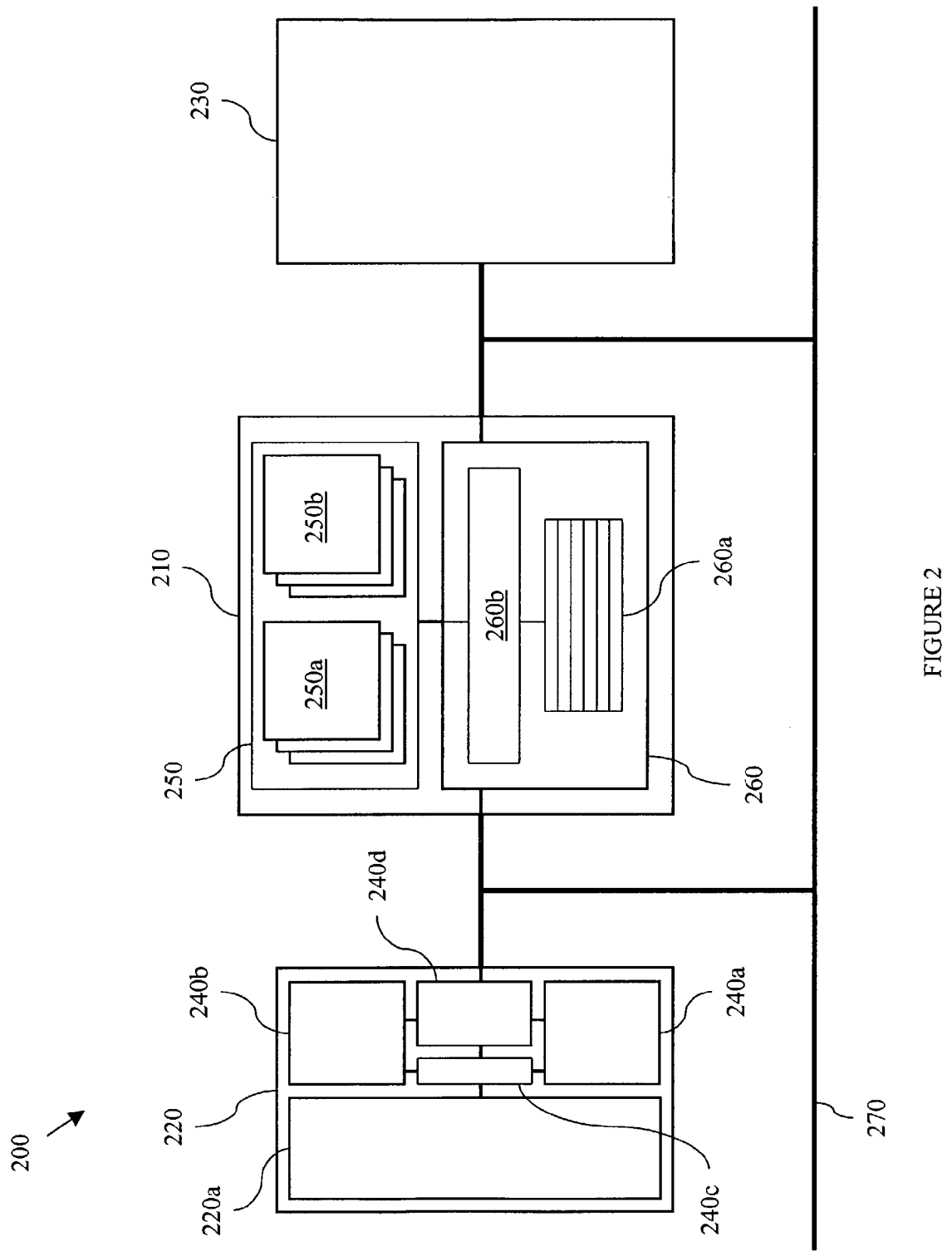
FIG. 2 illustrates a block diagram of one embodiment of a memory network that forms an environment within which an L2 cache may be incorporated, or a method of operating an L2 cache may be carried out, according to the principles of the present invention.

Turning now to FIG. 2, illustrated is a block diagram of one embodiment of a memory network 200 that forms an environment within which an L2 cache 210 may be incorporated, or a method of operating an L2 cache 210 may be carried out, according to the principles of the present invention. The memory network 200 may be at least similar to the memory network 120 shown in FIG. 1. For example, in addition to the L2 cache 210, the memory network 200 may include a CPU 220 and a main memory 230.

The main memory 230 may be a conventional memory device, such as those comprising DRAM memory cells. The CPU 220, which may be a conventional CPU, includes a conventional processor core 220a and an L1 cache 240. The L1 cache 240 may be formed on the same chip as the processor core 220a, or may be external to the processor core 220a, as known by those skilled in the pertinent art. The L1 cache 240 may include an L1 data cache memory 240a and an L1 instruction cache memory 240b, which may be conventional caches such as those comprising static random access memory ("SRAM") memory cells. The L1 cache 240 may also include an L1 cache controller 240c and an L1 bus interface 240d, as known to those skilled in the art. The L1 bus interface 240d may be a conventional or standard bus interface, or may be adapted for a specific bus, such as an Advanced Microcontroller Bus Architecture ("AMBA") bus.

The L2 cache 210 includes an L2 cache memory 250 and an L2 cache controller 260. The L2 cache memory 250 and/or the L2 cache controller 260 may be located on the same chip as the CPU 220 or on a separate chip (not shown). The L2 cache memory 250 may be a conventional cache such as those comprising SRAM memory cells. The cache memory 250 may include range partitions or separate cache memories, such as a tag array cache memory 250a and a data array cache memory 250b, as known to those skilled in the art.

The L2 cache controller 260 includes configuration registers 260a and a standard bus interface 260b. The configuration registers 260a allow at least one cacheable memory range to be defined, as described below. A standard bus interface, such as the standard bus interface 260b, is one that is not tailored or otherwise specific to a processor, such as the CPU 220. Thus, the standard bus interface 260b may be adapted for a specific bus 270, but it is not adapted for a specific processor. Accordingly, the L2 cache 210 can be adapted to operate with any standard or proprietary bus 270. For example, the standard bus interface 260b may be an AMBA bus interface. However, the L2 cache 210 of the present invention has far broader applicability. Those skilled in the pertinent art are familiar with the many standards for buses in existence today. These and future buses are within the broad scope of the present invention.

The standard bus interface 260b cooperates with the configuration registers 260a to allow the L2 cache controller 260 to operate in a configuration mode and an operating mode. In the configuration mode, values are written to the configuration registers 260a via the standard bus interface 260b to define each cacheable memory range. In the operating mode, the values written to the configuration registers 260a govern operation of the L2 cache controller 260 without requiring external cache control instructions. That is, the operating mode is executed without external cache control instructions (e.g., side-band signals in addition to a standard bus interface), and instead requires and employs only the existing values in the configuration registers 260a and data transferred to the L2 cache 210 via the standard bus interface 260b. Accordingly, because the configured L2 cache controller 260 operates without external cache control instructions, such as those that are conventionally sent by the CPU 220, the L2 cache appears "transparent" to the CPU 220.

The cacheable memory range may be within a range of the main memory 230. The memory range is therefore backed up by the main memory 230. Writes within the memory range may be written back or written through to the main memory 230. In an alternative embodiment, the cacheable memory range may be outside of a range main memory 230. In such an embodiment, the memory range is not backed up by the main memory 230, such as with a conventional scratchpad employed for temporary data storage.

The configuration registers 260a may further allow at least one attribute to be associated with the at least one cacheable memory range. The attribute may call for the at least one memory range to be writeback, writethrough or scratchpad, direct mapped or set-associative. Those skilled in the pertinent art understand the various attributes that can be given a range of cache memory.

In one embodiment of the present invention, the configuration registers 260a are memory-mapped. Accordingly, the configuration registers 260a may appear to the CPU 220 to be specific locations in the main memory 230, making the loading of values into the configuration registers 260a more straightforward. Of course, the configuration registers 260a could alternatively be accessible via a port (not shown).

The present invention thus provides an L2 cache having configuration registers 260a that are initially loaded with values that govern the operation of the secondary cache 210. Thereafter, the secondary cache 210 is "transparent" to the CPU 220. That is, the CPU 220 simply reads and writes data to any memory, and the L2 cache 210 caches data and fulfills the read and write requests in accordance with the values in the configuration registers 260a without requiring the CPU 220 to generate any external cache control instructions. For this reason, the L2 cache 210 of the present invention requires nothing more than a standard bus connection (via standard bus interface 260b) to the CPU 220.

Figure 3:
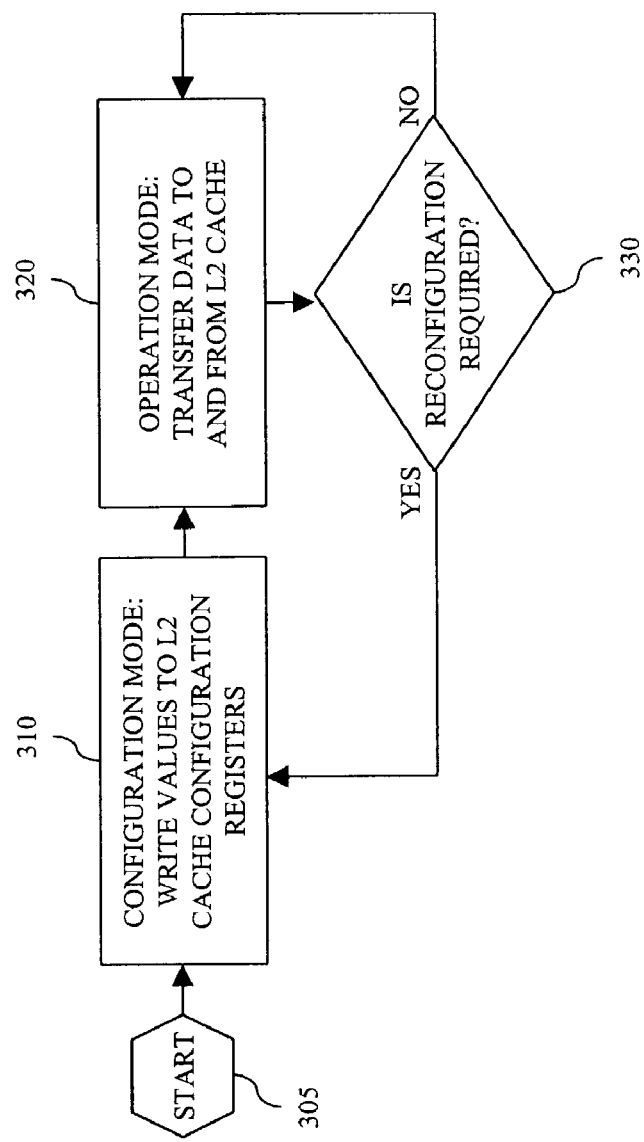
FIG. 3 illustrates a flow diagram of one embodiment of a method of operating a secondary cache according to the principles of the present invention.

Turning now to FIG. 3, illustrated is a flow diagram of one embodiment of a method 300 of operating a secondary cache according to the principles of the present invention. The method 300 may be performed by an L2 cache controller such as the L2 cache controller 260 shown in FIG. 2, and/or by a computer such as the computer 100 shown in FIG. 1. As also shown in FIG. 2, the L2 cache controller may be included in an L2 cache, such as the L2 cache 210, that also has at least one L2 cache memory, such as the L2 tag array cache memory 250a and the L2 data array cache memory 250b.

After the method 300 initiates at a step 305, values are written to configuration registers within the L2 cache in a step 310. The values are written to the configuration registers via only a standard bus interface, and define at least one cacheable memory range for the L2 cache memory. The step 310 may be one environment in which the configuration mode described above with reference to FIG. 2 may be embodied. Accordingly, the step 310 may include associating at least one attribute with the at least one cacheable memory range. The attribute may be selected from writeback, writethrough or scratchpad, direct mapped or set-associative. Those skilled in the pertinent art understand the various attributes that can be given a range of cache memory.

The cacheable memory range may be within or outside of a main memory range. Of course, the configuration registers may be memory-mapped, as known to those skilled in the art. In addition, as discussed above with reference to FIG. 2, the standard bus interface may be adapted for a specific bus. For example, the standard bus interface may be an AMBA bus. However, while the standard bus interface may be adapted for a specific bus, the standard bus interface is not tailored to a specific CPU, and may be configured to operate with any available CPU.

By employing a bus interposed by the L2 cache, the configured L2 cache controller operates to transfer data in a subsequent step 320. In the step 320, the values written to the configuration registers in the step 310 govern the manner in which the L2 cache operates with respect to the transferred data. Moreover, the cache operates in the step 320 in the absence of external cache control instructions. The step 320 may be one environment in which the operation mode described above with reference to FIG. 2 may be embodied. Hence, the L2 cache may continue to operate until it is determined that the configuration registers require reconfiguration.

In that regard, a decisional step 330 determines whether or not the L2 cache controller will be reconfigured by writing new values to the configuration registers. Accordingly, if it is necessary or desirable to reconfigure the L2 cache controller, the step 310 is repeated in the configuration mode, and the method 300 again proceeds to the operation mode in the step 320. The decision to reconfigure may be determined automatically by the L2 cache controller, by the CPU even though operation of the L2 cache may be transparent to the CPU, or by a user or programmer, such as one that desires specific memory ranges attributes to be defined by the values in the configuration registers.

Although the present invention has been described in detail, those skilled in the art should understand that they can make various changes, substitutions and alterations herein without departing from the spirit and scope of the invention in its broadest form.

The invention claimed is:

1. A secondary cache controller, comprising:
    configuration registers that allow at least one cacheable memory range to be defined; and
    a standard bus interface that cooperates with said configuration registers to allow said secondary cache controller to operate in:
        a configuration mode in which values are written to said configuration registers via only said standard bus interface to define said at least one cacheable memory range, and
        an operating mode in which said values govern operation of said secondary cache controller absent external cache control instructions.

2. The controller as recited in claim 1 wherein said configuration registers further allow at least one attribute to be associated with said at least one cacheable memory range.

3. The controller as recited in claim 1 wherein said cacheable memory range lies within a main memory range.

4. The controller as recited in claim 1 wherein said cacheable memory range lies outside of a main memory range.

5. The controller as recited in claim 1 wherein said configuration registers are memory-mapped.

6. The controller as recited in claim 1 wherein said standard bus interface is adapted for a specific bus.

7. The controller as recited in claim 1 wherein said standard bus interface is an Advanced Microcontroller Bus Architecture bus interface.

8. A method of operating a secondary cache, comprising:
    writing values to configuration registers within said cache via only a standard bus interface, said values defining at least one cacheable memory range for said cache memory; and
    employing a bus interposed by said cache to transfer data, said values governing a manner in which said cache operates with respect to said data absent external cache control instructions.

9. The method as recited in claim 8 further comprising associating at least one attribute with said at least one cacheable memory range.

10. The method as recited in claim 8 wherein said cacheable memory range lies within a main memory range.

11. The method as recited in claim 8 wherein said cacheable memory range lies outside of a main memory range.

12. The method as recited in claim 8 wherein said configuration registers are memory-mapped.

13. The method as recited in claim 8 wherein said standard bus interface is adapted for a specific bus.

14. The method as recited in claim 8 wherein said standard bus interface is an Advanced Microcontroller Bus Architecture bus interface.

15. A secondary cache, comprising:
    a secondary cache memory, and
    a secondary cache controller, coupled to said secondary cache memory and including:
        memory-mapped configuration registers that allow at least one cacheable memory range to be defined, and
        a standard bus interface that cooperates with said configuration registers to allow said secondary cache to operate in:
            a configuration mode in which values are written to said configuration registers via only said standard bus interface to define said at least one cacheable memory range, and
            an operating mode in which said values govern operation of said secondary cache controller absent external cache control instructions.

16. The secondary cache as recited in claim 15 wherein said configuration registers further allow at least one attribute to be associated with said at least one cacheable memory range.

17. The secondary cache as recited in claim 15 wherein said cacheable memory range lies within a main memory range.

18. The secondary cache as recited in claim 15 wherein said cacheable memory range lies outside of a main memory range.

19. The secondary cache as recited in claim 15 wherein said standard bus interface is adapted for a specific bus.

20. The secondary cache as recited in claim 15 wherein said standard bus interface is an Advanced Microcontroller Bus Architecture bus interface.

* * * * *